United States Patent
Barrick et al.

(10) Patent No.: US 10,360,036 B2
(45) Date of Patent: Jul. 23, 2019

(54) CRACKED EXECUTION OF MOVE-TO-FPSCR INSTRUCTIONS

(71) Applicant: INTERNATIONAL BUSINESS MACHINES CORPORATION, Armonk, NY (US)

(72) Inventors: Brian J. D. Barrick, Pflugerville, TX (US); Maarten J. Boersma, Holzgerlingen (DE); Niels Fricke, Herrenberg (DE); Michael J. Genden, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 176 days.

(21) Appl. No.: 15/648,247

(22) Filed: Jul. 12, 2017

(65) Prior Publication Data
US 2019/0018678 A1 Jan. 17, 2019

(51) Int. Cl.
G06F 9/30 (2018.01)
G06F 9/38 (2018.01)
G06F 7/499 (2006.01)
G06F 7/483 (2006.01)

(52) U.S. Cl.
CPC ........ G06F 9/3017 (2013.01); G06F 9/30032 (2013.01); G06F 9/30196 (2013.01); G06F 9/3853 (2013.01); G06F 7/483 (2013.01); G06F 7/499 (2013.01); G06F 9/3001 (2013.01); G06F 9/3009 (2013.01); G06F 9/3836 (2013.01)

(58) Field of Classification Search
CPC .. G06F 9/3853; G06F 9/30196; G06F 9/3017; G06F 9/30032; G06F 9/3836; G06F 7/483; G06F 7/499
See application file for complete search history.

(56) References Cited

U.S. PATENT DOCUMENTS

| 6,014,743 | A  | * | 1/2000  | Henry ..................... G06F 9/226 712/222 |
| 6,032,249 | A  | * | 2/2000  | Olson ................. G06F 9/30094 712/200 |
| 2011/0029760 | A1 | * | 2/2011  | Elmer ................. G06F 9/30025 712/209 |
| 2011/0219213 | A1 |   | 9/2011  | Busaba et al. |
| 2011/0276764 | A1 | * | 11/2011 | Alexander .......... G06F 9/30032 711/125 |
| 2014/0281405 | A1 |   | 9/2014  | Streett et al. |
| 2016/0313997 | A1 |   | 10/2016 | Gschwind et al. |

OTHER PUBLICATIONS

Steve Behling, Ron Bell, Peter Farrell, Holger Holthoff, Frank O'Connell and Will Weir, "The Power4 Processor Introduction and Tuning Guide", Nov. 2001, IBM, pp. 9-10 (Year: 2001).*
"PowerPC Microprocessor Family: The Programmer's Reference Guide", 1995, IBM, pp. 9-19 (Year: 1995).*

* cited by examiner

*Primary Examiner* — Aimee Li
*Assistant Examiner* — Courtney P Carmichael-Moody
(74) *Attorney, Agent, or Firm* — Tutunjian & Bitetto, P.C.; Bryan Bortnick

(57) ABSTRACT

A computer processing system is provided. The computer processing system includes a processor configured to crack a Move-To-FPSCR instruction into two internal instructions. A first one of the two internal instructions executes out-of-order to update a control field and a second one of the two internal instructions executes in-order to compute a trap decision.

20 Claims, 5 Drawing Sheets

CRACKED EXECUTION OF MOVE-TO-FPSCR INSTRUCTIONS

BACKGROUND

Technical Field

The present invention relates generally to information processing and, in particular, to cracked execution of Move-To-FPSCR Instructions.

Description of the Related Art

The architecture of the POWER series of processors provides a Floating Point Status and Control Register (FPSCR). A status portion of the FPSCR collects the exceptions of floating point instructions. A control portion of the FPSCR controls the execution of floating point instructions (e.g., enable trap-on-execution, rounding mode).

The instruction category that is used to write to the FPSCR is Move-To-FPSCR instructions. However, there are contradicting requirements for Move-To-FPSCR instructions. For example, a Move-to-FPSCR instruction updates the control field; subsequent FP instructions wait for it. Thus, for performance, the control field has to be updated as soon as possible. Hence, updating of the control field can benefit from out-of-order execution. Moreover, Move-to-FPSCR signals a trap if it sets the enable bit for an exception that occurred earlier. To receive the correct value of Overflow Exception (OX), all older instructions should be waited for, hence requiring in-order execution. An example can involve changing Overflow Enable (OE) from 0 to 1 while the OX was already 1. The naive solution is to always execute Move-To-FPSCR in-order (completion-serialized). However, the performance impact is not acceptable in such cases.

The POWER7® and POWER8® processor implementations use out-of-order execution, but have a complex completion scheme for trap detection. For example, the scheme involves a two-step completion (cycle X and X+N), where completion is blocked for N cycles (5<N<10). Also, some processor implementations can only execute one Move-To-FPSCR at a time.

Hence, there is a need for a simpler scheme that still allows for an early update of the control field.

SUMMARY

According to an aspect of the present invention, a computer processing system is provided. The computer processing system includes a processor configured to crack a Move-To-FPSCR instruction into two internal instructions. A first one of the two internal instructions executes out-of-order to update a control field and a second one of the two internal instructions executes in-order to compute a trap decision.

According to another aspect of the present invention, a computer-implemented method is provided for Move-to-FPSCR instruction execution. The method includes cracking, by a processor, a Move-To-FPSCR instruction into two internal instructions. A first one of the two internal instructions executes out-of-order to update a control field and a second one of the two internal instructions executes in-order to compute a trap decision.

According to yet another aspect of the present invention, a computer program product is provided for Move-to-FPSCR instruction execution. The computer program product includes a computer readable storage medium having program instructions embodied therewith. The program instructions are executable by a computer to cause the computer to perform a method. The method includes cracking, by a processor, a Move-To-FPSCR instruction into two internal instructions. A first one of the two internal instructions executes out-of-order to update a control field and a second one of the two internal instructions executes in-order to compute a trap decision.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to cracked execution of Move-To-FPSCR Instructions. The present invention provides efficient execution of Move-To-FPSCR Instructions.

In an embodiment, the present invention cracks Move-To-FPSCR instruction into two internal instructions, where a first one of the two internal instructions updates a control field and a second one of the two internal instructions computes a trap decision. In an embodiment, the Move-to-FPSCR instruction is cracked into the two internal instructions independent of a machine state.

Figure 1:
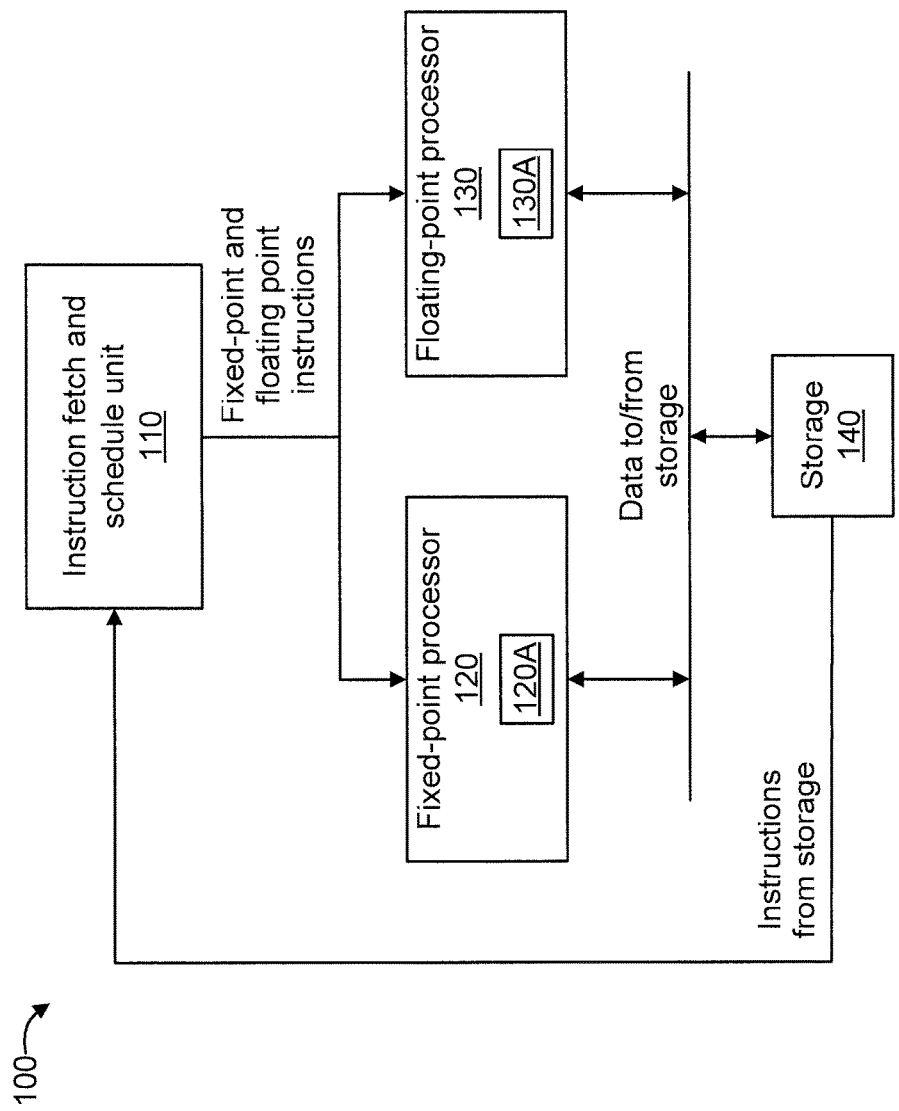
FIG. 1 shows an exemplary processor to which the present invention can be applied, in accordance with an embodiment of the present invention.

FIG. 1 shows an exemplary processor 100 to which the present invention can be applied, in accordance with an embodiment of the present invention.

The processor 100 include instruction fetch and schedule unit 110, a fixed-point processor 120, a floating-point processor 130, and a storage element 140. The fixed-point processor 120 includes a set of registers 120A. The floating-point processor 130 includes a set of registers 130A. The particular registers included in the fixed-point and floating-point processors 120, and 130, respectively, will depend on the particular processor used as readily appreciated by one of ordinary skill in the art.

The processor 100 can process, for example, fixed-point instructions and floating-point instructions. From a logical perspective, processing begins at the tip with instruction fetching and scheduling, which issues to either fixed-point or floating-point processing. These processes send and receive data from the storage element 140. The storage element 140 will send more instructions to the instruction fetch and schedule unit 110.

In an embodiment, processor 100 is a multi-core processor configured to perform simultaneous multithreading. In an embodiment, processor 100 is a multi-core superscalar symmetric processor.

Processor 100 is shown and described for the sake of illustration. However, it is to be appreciated other processor and processor configurations can also be used in accordance with the teachings of the present invention, while maintaining the spirit of the present invention.

Modern processors often include a mechanism to break down complicated instructions in a pair (series) of simpler internal instructions. This technique of breaking down instructions is referred to as "cracking". In an embodiment of the present invention, a Move-to-FPSCR instruction is cracked in order to realize early execution of subsequent FP instructions and straightforward trap detection.

Figure 2:
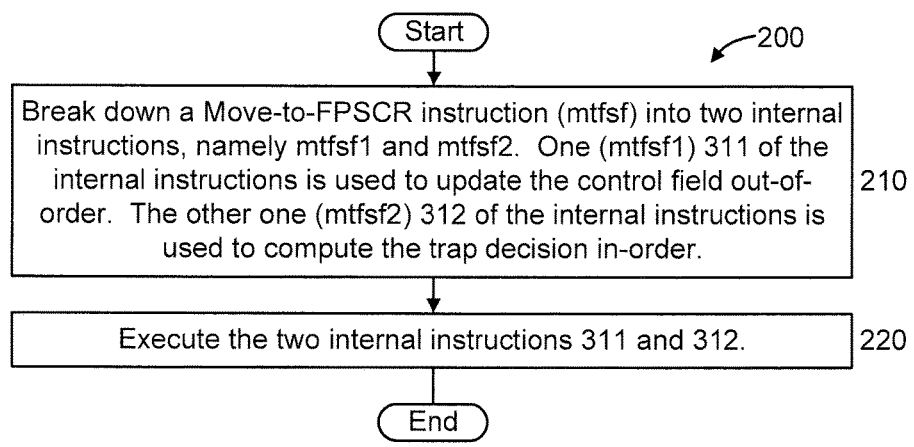
FIG. 2 shows an exemplary method for Move-to-FPSCR instruction cracking, in accordance with an embodiment of the present invention.
Figure 3:
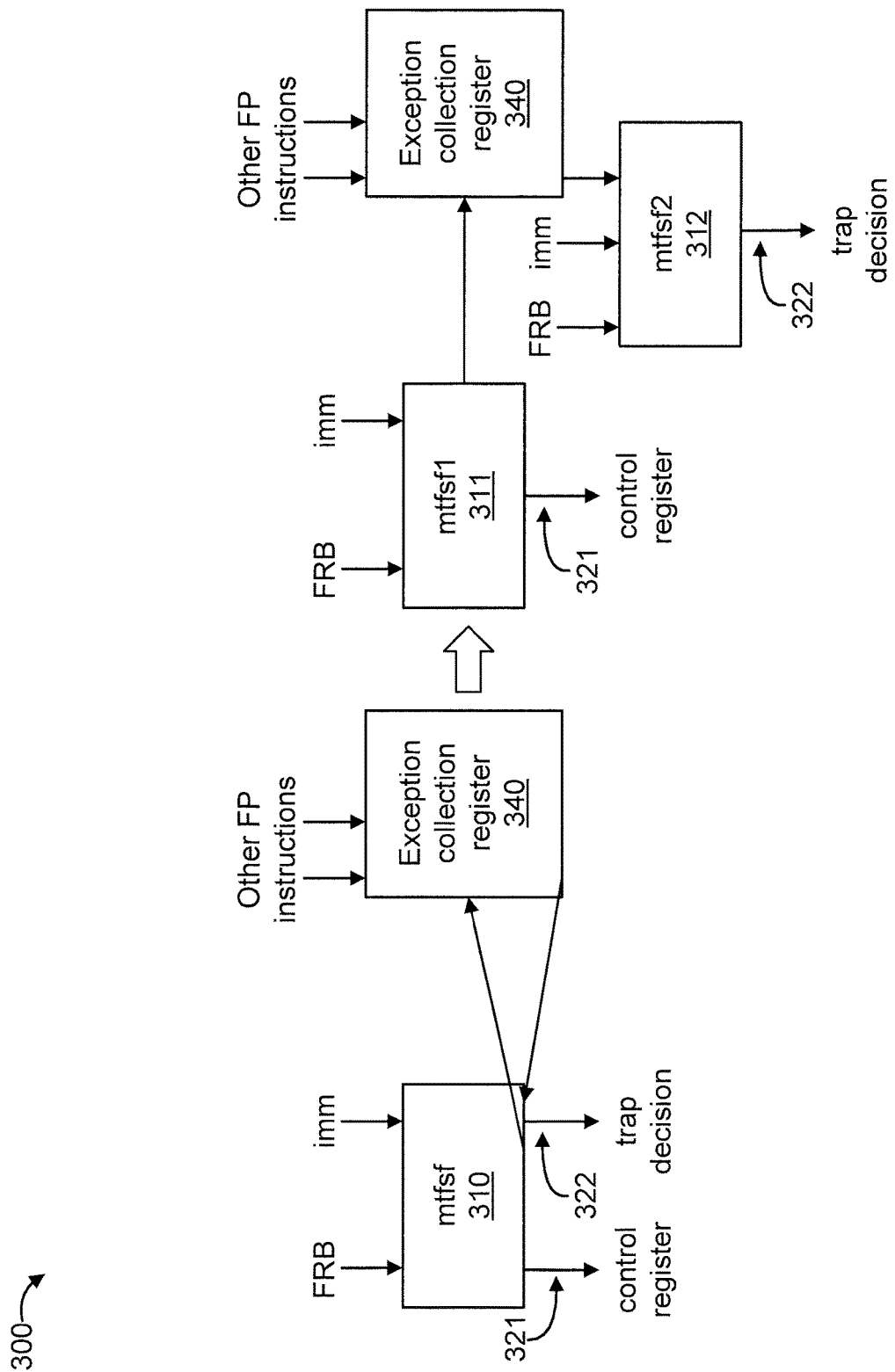
FIG. 3 graphically shows an exemplary cracking of a Move-to-FPSCR instruction into two internal instructions using the method of FIG. 2, in accordance with an embodiment of the present invention.

FIG. 2 shows an exemplary method 200 for Move-to-FPSCR instruction cracking, in accordance with an embodiment of the present invention. FIG. 3 graphically shows an exemplary cracking 300 of a Move-to-FPSCR instruction 310 into two internal instructions 311 and 312 using the method 200 of FIG. 2, in accordance with an embodiment of the present invention.

The "Move-to-FPSCR" instruction 310, interchangeably referred to as "mtfsf", involves a control register signal 321 and a trap decision signal 322. An exception collection register 340 is used to collect exceptions for the Move-to-FPSCR instruction 310 and other FP instructions. An "imm" signal can be used such that a move is to be performed from the "Immediate" Field of the Move-to-FPSCR instruction. FRB specifies the source floating-point register.

At step 210, break down a Move-to-FPSCR instruction (mtfsf) into two internal instructions, namely mtfsf1 and mtfsf2. One (mtfsf1) 311 of the internal instructions is used to update the control field out-of-order. The other one (mtfsf2) 312 of the internal instructions is used to compute the trap decision in-order. That is, mtfsf1 311 is executed out-of-order to update the control field, while mtfsf2 312 is executed in-order to compute the trap decision.

At step 220, execute the two internal instructions 311 and 312.

Hence, the first instruction mtfsf1 311 is used to update the control field by the control register signal 321, and the second instruction mtfsf2 312 is used to compute the trap decision as the trap signal 322.

It is to be appreciated that the present invention performs critical work as soon as possible, while essentially imposing some wait period for less critical work. In this way, early execution of subsequent FP instructions can be achieved as well as straightforward trap detection. It is to be further appreciated that the respective executions of the first internal instruction mtfsf1 311 and the second internal instruction mtfsf2 312 reduce the critical code path of the Move-to-FPSCR instruction 310 and/or of a program that includes the Move-to-FPSCR instruction 310.

In an embodiment, any of the internal instructions can be the older instruction. In an embodiment, it is preferred that the internal instruction that computes the trap decision be the older instruction. This is because in the POWERS® processor, for any cracked instruction, it is desirable to have exceptions reported by the oldest internal instruction. However, it is to be appreciated that even in this scenario, the internal instruction that updates the control register (the younger one) will typically execute before the internal instruction that computes the trap decision (the older one).

An additional aspect of the present invention will now be described, in accordance with an embodiment of the present invention.

It is to be appreciated that all FP instructions can SET exception bits. However, only Move-To-FPSCR can CLEAR exceptions bits.

Further to the preceding, consider the following example. The example involves 14 exception bits.

Figure 4:
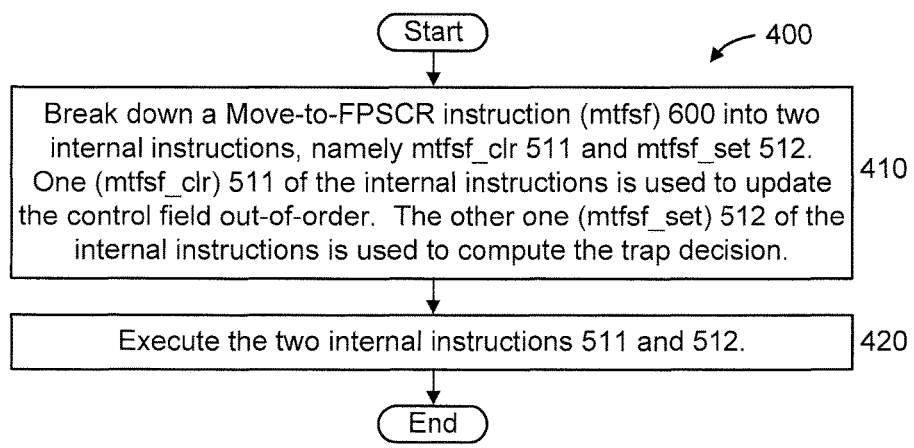
FIG. 4 shows an exemplary method for Move-to-FPSCR instruction cracking, in accordance with an embodiment of the present invention.
Figure 5:
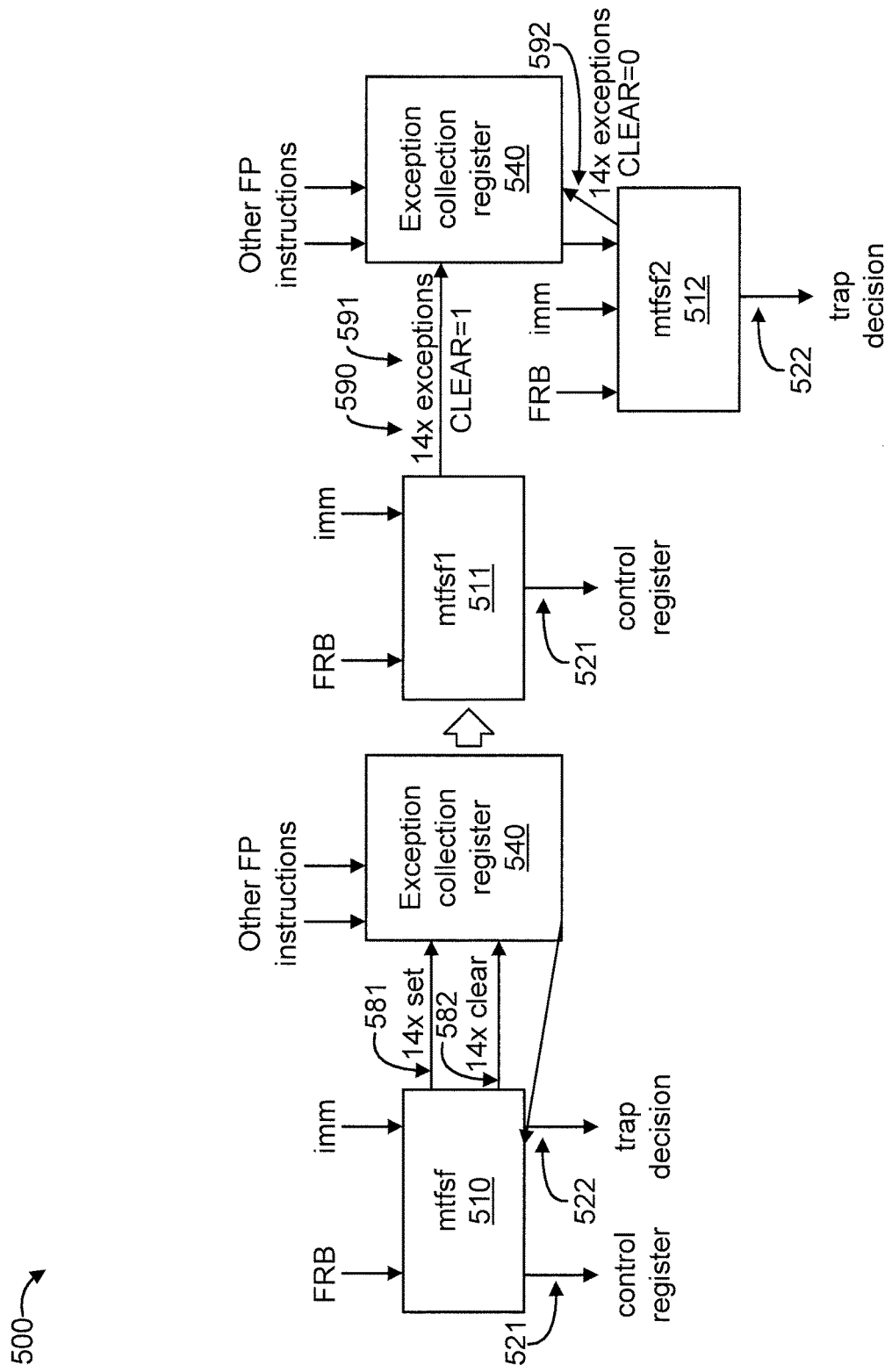
FIG. 5 graphically shows the cracking of a Move-to-FPSCR instruction into two internal instructions using the method of FIG. 4, in accordance with an embodiment of the present invention.

FIG. 4 shows an exemplary method 400 for Move-to-FPSCR instruction cracking, in accordance with an embodiment of the present invention. FIG. 5 graphically shows the cracking 500 of a Move-to-FPSCR instruction 510 into two internal instructions 511 and 512 using the method 400 of FIG. 4, in accordance with an embodiment of the present invention.

The "Move-to-FPSCR" instruction 510, interchangeably referred to as "mtfsf", involves a control register signal 521 and a trap decision signal 522. An exception collection register 540 is used to collect exceptions for the Move-to-FPSCR instruction 510 and other FP instructions. An "imm" signal can be used such that a move is to be performed from the "Immediate" Field of the Move-to-FPSCR instruction.

At step 410, break down a Move-to-FPSCR instruction (mtfsf) 600 into two internal instructions, namely mtfsf_clr 511 and mtfsf_set 512. One (mtfsf_clr) 511 of the internal instructions is used to update the control field out-of-order. The other one (mtfsf_set) 512 of the internal instructions is used to compute the trap decision.

At step 420, execute the two internal instructions 511 and 512.

Regarding the state of the art (i.e., the prior art), a 2 bit encoding per exception to support "set/clear/no-change": 2×14b=28 bits. The state of the art approach incurs 100% overhead to support Move-To-FPSCR, because for regular instructions 1×14b (1×14 bits) is sufficient, as shown using 1×14b exception buses 581 and 582.

In contrast, the present invention, in using the cracking technique described herein, provides the following: (1) 1×14b exception bus 590 with 1 additional CLEAR bit (CLEAR=1) 591: 14+1=15 bits; (2) one internal instruction that CLEARs selected exception bits; and (3) another internal instruction that SETs selected exception bits. The internal instruction mtfsf_set 512 can provide 14× exceptions 592 with CLEAR=0.

Hence, the present invention provides an efficient encoding for clearing exception bits, where the internal instruction that updates the control register is the internal instruction that clears the exception bits. This approach ensures that the exceptions reported by younger FP instructions will not get cleared, since younger FP instructions wait for the control register update.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer processing system, comprising:
a processor configured to crack a Move-To-FPSCR instruction into two internal instructions, wherein a first one of the two internal instructions executes out-of-order to update a control field and a second one of the two internal instructions executes in-order to compute a trap decision.

2. The computer processing system of claim 1, wherein the processor is configured to crack the Move-to-FPSCR instruction into the two internal instructions independent of a machine state.

3. The computer processing system of claim 1, wherein respective executions of the first internal instruction and the second internal instruction by the processor reduce a critical code path of a computer program that includes the Move-to-FPSCR instruction.

4. The computer processing system of claim 1, wherein the processor is a multi-core processor configured to perform simultaneous multithreading.

5. The computer processing system of claim 1, wherein the processor is a multi-core superscalar symmetric processor.

6. The computer processing system of claim 1, wherein the processor cracks the Move-To-FPSCR instruction into the two internal instructions such that one of the first one or the second one of the two internal instructions clears selected exception bits and another one of the first one or the second one of the two internal instructions sets other selected exception bits.

7. The computer processing system of claim 6, wherein the processor is further configured to use a same one of the internal instructions to update a control register and clear exception bits.

8. The computer processing system of claim 6, wherein any of the first one and the second one of the two internal instructions can be older relative to the other.

9. A computer-implemented method for Move-to-FPSCR instruction execution, comprising:
cracking, by a processor, a Move-To-FPSCR instruction into two internal instructions, wherein a first one of the two internal instructions executes out-of-order to update a control field and a second one of the two internal instructions executes in-order to compute a trap decision.

10. The computer-implemented method of claim 9, wherein the Move-to-FPSCR instruction is cracked into the two internal instructions independent of a machine state.

11. The computer-implemented method of claim 9, wherein respective executions of the first internal instruction and the second internal instruction reduce a critical code path of a computer program that includes the Move-to-FPSCR instruction.

12. The computer-implemented method of claim 9, wherein the processor is a multi-core processor configured to perform simultaneous multithreading.

13. The computer-implemented method of claim 9, wherein the processor is a multi-core superscalar symmetric processor.

14. The computer-implemented method of claim 9, wherein said cracking step cracks the Move-To-FPSCR instruction into the two internal instructions such that one of the first one or the second one of the two internal instructions clears selected exception bits and another one of the first one or the second one of the two internal instructions sets other selected exception bits.

15. The computer-implemented method of claim 14, further comprising using a same one of the internal instructions to update a control register and clear exception bits.

16. The computer-implemented method of claim 14, wherein any of the first one and the second one of the two internal instructions can be older relative to the other.

17. A computer program product for Move-to-FPSCR instruction execution, the computer program product comprising a computer readable storage medium having program instructions embodied therewith, the program instructions executable by a computer to cause the computer to perform a method comprising:
cracking, by a processor, a Move-To-FPSCR instruction into two internal instructions, wherein a first one of the two internal instructions executes out-of-order to update a control field and a second one of the two internal instructions executes in-order to compute a trap decision.

18. The computer program product of claim 17, wherein the Move-to-FPSCR instruction is cracked into the two internal instructions independent of a machine state.

19. The computer program product of claim 17, wherein respective executions of the first internal instruction and the second internal instruction reduce a critical code path of a computer program that includes the Move-to-FPSCR instruction.

20. The computer-implemented method of claim 17, wherein the cracking step cracks the Move-To-FPSCR instruction into the two internal instructions such that one of the first one or the second one of the two internal instructions clears selected exception bits and another one of the first one or the second one of the two internal instructions sets other selected exception bits.

* * * * *